US009301271B2

(12) United States Patent
Cui et al.

(10) Patent No.: US 9,301,271 B2
(45) Date of Patent: Mar. 29, 2016

(54) METHOD FOR AIR INTERFACE SYNCHRONIZATION

(71) Applicant: Beijing University of Posts and Telecommunications, Beijing (CN)

(72) Inventors: Qimei Cui, Beijing (CN); Xiaofeng Tao, Beijing (CN); Liang Zeng, Beijing (CN); Yingni Zhang, Beijing (CN); Ningyu Chen, Beijing (CN)

(73) Assignees: Beijing University of Posts and Telecommunications (CN); Wuxi BUPT Sensing Technology and Business Research Institute Company Limited (CN)

( * ) Notice: Subject to any disclaimer, the term of this patent is extended or adjusted under 35 U.S.C. 154(b) by 0 days.

(21) Appl. No.: 14/450,827

(22) Filed: Aug. 4, 2014

(65) Prior Publication Data
US 2015/0055645 A1  Feb. 26, 2015

(30) Foreign Application Priority Data

Aug. 21, 2013  (CN) .......................... 2013 1 0367720

(51) Int. Cl.
*H04J 3/06* (2006.01)
*H04W 56/00* (2009.01)

(52) U.S. Cl.
CPC .................................. *H04W 56/001* (2013.01)

(58) Field of Classification Search
None
See application file for complete search history.

(56) References Cited

U.S. PATENT DOCUMENTS

| 6,560,245 | B1 | 5/2003 | Slater | |
|---|---|---|---|---|
| 7,139,264 | B1 | 11/2006 | Slater | |
| 7,499,423 | B1 * | 3/2009 | Amos | G01S 5/06 324/387 |
| 2008/0240073 | A1 * | 10/2008 | Pun | H04W 56/0015 370/350 |
| 2009/0122782 | A1 * | 5/2009 | Horn | H04W 56/001 370/350 |
| 2012/0120874 | A1 * | 5/2012 | McLaughlin | H04W 56/002 370/328 |
| 2013/0070751 | A1 * | 3/2013 | Atwal | H04W 56/001 370/350 |
| 2013/0155945 | A1 * | 6/2013 | Chen | H04J 3/0661 370/328 |
| 2013/0230041 | A1 * | 9/2013 | Han | H04W 56/001 370/350 |
| 2013/0336307 | A1 * | 12/2013 | Park | H04W 56/00 370/350 |
| 2014/0269645 | A1 * | 9/2014 | Do | G01S 5/021 370/338 |

FOREIGN PATENT DOCUMENTS

| CN | 101123468 A | 2/2008 |
|---|---|---|
| CN | 101938824 A | 1/2011 |
| CN | 102006135 A | 4/2011 |
| CN | 102625438 A | 8/2012 |

* cited by examiner

*Primary Examiner* — Dang Ton
*Assistant Examiner* — Ronald H Davis
(74) *Attorney, Agent, or Firm* — Lerner, David, Littenberg, Krumholz & Mentlik, LLP

(57) ABSTRACT

The present disclosure relates to the technical field of LTE-A, and discloses a method for air interface synchronization between base stations. A base station to be synchronized, which simultaneously monitors a plurality of neighboring base stations, can select one neighboring base station to perform time-service synchronization in accordance with different criteria in order, such as whether CoMP is necessary, the time-service hop count, time-service delay, and the CQI level (channel quality indicator) and the like. That is, the most suitable synchronization source is determined according to a certain priority order. Such solution both applies to a phase of initial establishment of air interface self-synchronization between base stations, and also to a phase of periodic synchronization maintenance. In addition, the technical effect of such solution is particularly prominent in the case of intensively arranged Small Cells.

7 Claims, 4 Drawing Sheets

METHOD FOR AIR INTERFACE SYNCHRONIZATION

CROSS-REFERENCE TO RELATED APPLICATIONS

The present application claims the benefit of the filing date of Chinese Patent Application No. 201310367720.7 filed on Aug. 21, 2013, the disclosure of which is incorporated herein by reference.

TECHNICAL FIELD

The present disclosure relates to the technical field of LTE-A, in particular to a method for air interface synchronization between base stations.

TECHNICAL BACKGROUND

LTE (Long Term Evolution) is a long term evolution of the technology standards of the Universal Mobile Telecommunications System (UMTS) developed by the 3GPP organization. A LTE system has introduced some crucial transmission technologies, such as OFDM and the multi-antenna MIMO which significantly increase the spectrum efficiency and data transmission rate. The LTE system supports a variety of bandwidth allocations so that the spectrum allocation can be more flexible and the system capacity and coverage can be significantly improved. LTE wireless network tends to have a more flat architecture, which decreases the system latency and lowers the costs of network construction and maintenance. LTE R12 introduces Small Cell, i.e., a small cell base station which is a low-powered wireless access node and operates at licensed and unlicensed spectrum. Small Cell may be used indoors or outdoors, and it may cover a 10-meter indoor space or a 2 km range in the open field. In contrast, the coverage of a macrocell base station may be up to several kilometers. Small Cell integrates the technologies of femtocell, picocell, microcell, and distributed wireless. Small Cells are characterized by their intensive arrangements and overlapping coverage areas.

The wireless communication system sends and receives signals at the same frequency band, wherein if synchronization between cells fails to be maintained, there will be severe interference between the signal sending and receiving processes. TDD network, in particular, requires the cells to maintain precisely synchronized (in microsecond level) sub-frame boundaries and to be configured with the same uplink to downlink ratio in the same TDD synchronization area. Therefore, the synchronization and time service of a cell base station is a crucial matter in the wireless communication network. The Time service modes currently applied mainly include GPS synchronization, network synchronization, terminal measurement auxiliary synchronization, and air interface self-synchronization between base stations. The main idea of the air interface self-synchronization between base stations is that a base station can synchronize with other base stations in the network which have already been synchronized. Air interface self-synchronization includes initial establishment of synchronization and periodical maintaining of synchronization. In the phase of initial establishment of synchronization, a base station A, which is assumed to have synchronized with the absolute time, becomes the time reference for other base stations in the synchronization area for acquiring synchronization. The other based stations simulate the behavior of a terminal, and search for a synchronization signal from the base station A to adjust their respective timing to coincide with that of the base station A, so that synchronization among base stations can be obtained. In order to prevent clock drift, periodical tracking of synchronization signal is further required, which is a similar process as the initial establishment of synchronization. Time interval of the periodical tracking of a self-synchronization cell may be in terms of seconds or longer. The method of air interface self-synchronization between base stations requires the base stations to be able to monitor each other.

In the case of Small Cell, the base stations are more applicable in indoor situation, and GPS time service synchronization is severely restricted by the indoor penetration problem. Therefore, the communication between the base stations mainly relies on the air interface communication, air interface self-synchronization being the most commonly used method. However, because of the intensive arrangements of Small Cells, one small cell base station may monitor a plurality of neighboring base stations simultaneously, and thus there would be problems of time service conflict and time service selection. That is, if one Small Cell simultaneously monitors a plurality of neighboring Small Cells, said Small Cell needs to select one synchronization source from the plurality of neighboring Small Cells.

SUMMARY OF THE INVENTION

I. Technical Problems to be Solved

The objective of the present disclosure is to provide a method for air interface synchronization between base stations, so that a base station to be synchronized can determine one synchronization source from all the neighboring base stations that it can monitor.

II. Technical Solution

To solve the above problem, the present disclosure provides a method for air interface synchronization, comprising the following steps:

step A: searching, through a base station to be synchronized, for all neighboring base stations that can be monitored by the base station to be synchronized, and denoting the number of all neighboring base stations as $N_0$, wherein if $N_0$ is 1, the base station to be synchronized performs synchronization with this neighboring base station, and if $N_0$ is greater than 1, proceeding to step B, step B: determining, through the base station to be synchronized, whether said base station to be synchronized needs to perform coordinated multipoint transmission with one of the $N_0$ neighboring base stations, wherein if so, the base station to be synchronized performs synchronization with the neighboring base station with which the base station needs to perform coordinated multipoint transmission, otherwise, proceeding to step C, step C: detecting, through the base station to be synchronized, the respective numbers of time-service hop count of the $N_0$ neighboring base stations, and denoting the number of the neighboring base stations having the minimum time-service hop count as $N_1$, wherein if $N_1$ is 1, the base station to be synchronized performs synchronization with this neighboring base station having the minimum hop count, otherwise, proceeding to step D, step D: detecting, through the base station to be synchronized, the time-service delay of the $N_1$ neighboring base stations, and denoting the number of neighboring base stations having the minimum time-service delay as $N_2$, wherein if $N_2$ is 1, the base station to be synchronized performs synchronization with the neighboring base having the minimum time-service delay, otherwise, proceeding to step E, and step E: detecting, through the base station to be synchronized, the channel quality indicators of the $N_2$ neighboring base stations, and performing synchronization with the neighboring base station having the maximum channel quality indicator.

Optionally, step E further comprises:

if the number of the neighboring base stations having the maximum channel quality indicator, which is dented as $N_3$, is greater than 1, then the base station to be synchronized randomly synchronizes with one of the $N_3$ neighboring base stations.

Optionally, the channel quality indicator is computed according to the channel delay, signal to noise ratio (SNR), signal to interference plus noise ratio (SINR), and the signal to noise distortion ratio (SNDR) and the like.

Optionally, the method according to the present disclosure further comprises:

step F: the base station to be synchronized repeating steps A to E at intervals of a predetermined time span.

Optionally, said predetermined time span is one second.

Optionally, in said step C, the base station to be synchronized detecting the time-service hop count of the $N_0$ neighboring base stations specifically comprises:

said base station to be synchronized setting a count value as JUMP=0, and the count value JUMP being transmitted respectively to each of these $N_0$ neighboring base stations $C_i$, wherein $1 \leq i \leq N_0$;

the neighboring base station $C_i$ adding 1 to the count value JUMP, and determining whether itself is a standard time-service base station, wherein if so, the neighboring base station $C_i$ directly returns the count value JUMP to the base station to be synchronized, otherwise it transmits the count value JUMP to the standard time-service base station of its own; the count value JUMP is added by 1 at each base station between the neighboring base station $C_i$ and its standard time-service station; the standard time-service base station of the neighboring base station $C_i$ adds 1 to the count value JUMP, and returns the final count value JUMP to the station to be synchronized;

the count value JUMP returned to said base station to be synchronized being the time-service hop count of the neighboring base station $C_i$.

Optionally, the station to be synchronized is a small cell base station.

III. Beneficial Technical Effects

With the technical solution of the present disclosure, the base station to be synchronized, which simultaneously monitors a plurality of neighboring base stations, can select one neighboring base station with which it performs time-service synchronization according to different criteria in order, such as whether CoMP is necessary, the time-service hop count, time-service delay, and the CQI level (channel quality indicator) and the like, that is, selecting the most suitable synchronization source by certain priority order. Such solution applies to both the initial establishment phase of air interface self-synchronization between base stations, and the periodic synchronization maintenance phase. In addition, the technical effect of this solution is particularly prominent in the case of intensively arranged Small Cells.

DETAILED DESCRIPTION OF DRAWINGS

Figure 1:
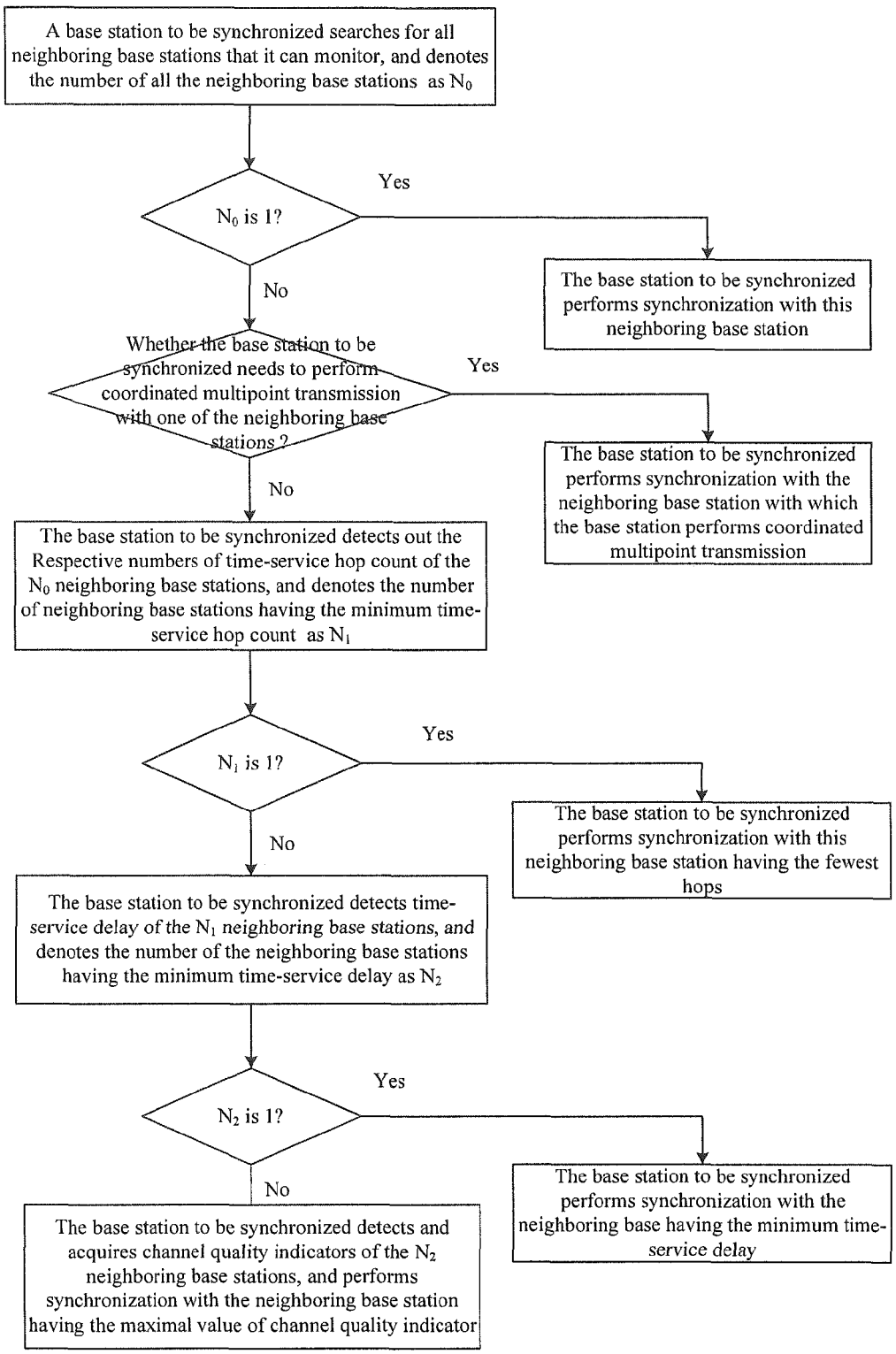
FIG. 1 is a flowchart of a method for air interface synchronization according to an embodiment of the present disclosure.

The present disclosure will be further described in combination with the accompanying drawings and examples.

The present disclosure primarily aims to solve the problem of how to determine a synchronization source when abase station obtains synchronization by air interface self-synchronization method under complex conditions. Said complex conditions include: (1) the base station per se cannot acquire the standard synchronization time through GPS or any other means; (2) the state of the neighboring base stations keeps changing, e.g., the neighboring base stations may be dynamically switched on/off; (3) business requirements of the base station synchronization is constantly varying, e.g., the requirement of CoMP (coordinated multipoint transmission) by UE; (4) confliction of time service, that is, selection should be made when there is a plurality of neighboring base stations and the respective time services thereof are not unified.

The synchronization between a base station and its neighboring base stations should take the following aspects into account:

1. Impact by the closure of the neighboring base stations: daily routines (working during the day time and resting during the night) of the vast majority of users would lead to sharp reduction of traffic in local areas of cellular network during a certain period of time. Thus, some small cell base stations can be switched off to reduce power consumption when the traffic in these cells is too low or even turns zero. If a base station detects a switch-off of a neighboring base station with which synchronization is originally established, said base station needs to select another neighboring base station for temporary time service.

2. Business requirement of CoMP: CoMP technology refers to the technology of disposing a cell-edge user at a common frequency of several base stations, so that these base stations may serve the user simultaneously, and thereby the coverage performance of the edge user can be enhanced. CoMP technology can reduce interference among cells, and improve the spectrum efficiency of cell edge users. Accordingly, CoMP technology is highly demanding in synchronization among these collaborative base stations.

3. Selection from conflicted time service: in the case of high density arrangement of base stations (especially Small Cells), one base station may simultaneously listen to a plurality of neighboring base stations which have different time services. In view of this, the base station should make one selection from the multiple conflicted time service sources.

4. Selection of time service hop count: under the condition of high density arrangement of base stations, a neighboring base station is most likely to be synchronized by way of synchronizing another neighboring base station, namely multi-hop. Multi-hop phenomenon leads to delay, because of which the inaccuracy of a synchronization signal rises as the number of hops increases. Therefore, the base station should prioritize a base station with lower hop count as its time service source.

5. Selection of channel condition: time-service signals of the neighboring base stations may have varying degrees of delay due to the different channel conditions. In view of this, the base station should take the channel delay into account and select a neighboring base station having a small delay as its synchronization signal.

Based on above analysis of various situations, the present disclosure provides a method for air interface synchronization. As shown in FIG. 1, the method comprises the following steps:

step A: searching, through a base station to be synchronized, for all neighboring base stations that can be monitored by the base station to be synchronized, and denoting the number of all neighboring base stations as $N_0$, wherein if $N_0$ is 1, the base station to be synchronized performs synchronization with this neighboring base station, and if $N_0$ is greater than 1, proceeding to step B, step B: determining, through the base station to be synchronized, whether said base station to be synchronized needs to perform coordinated multipoint transmission with one of the $N_0$ neighboring base stations, wherein if so, the base station to be synchronized performs synchronization with the neighboring base station with which the base station needs to perform coordinated multipoint transmission, otherwise, proceeding to step C, step C: detecting, through the base station to be synchronized, the respective numbers of time-service hop count of the $N_0$ neighboring base stations, and denoting the number of the neighboring base stations having the minimum time-service hop count as $N_1$, wherein if $N_1$ is 1, the base station to be synchronized performs synchronization with this neighboring base station having the minimum hop count, otherwise, proceeding to step D, step D: detecting, through the base station to be synchronized, the time-service delay of the $N_1$ neighboring base stations, and denoting the number of neighboring base stations having the minimum time-service delay as $N_2$, wherein if $N_2$ is 1, the base station to be synchronized performs synchronization with the neighboring base having the minimum time-service delay, otherwise, proceeding to step E, and step E: detecting, through the base station to be synchronized, the channel quality indicators of the $N_2$ neighboring base stations, and performing synchronization with the neighboring base station having the maximum channel quality indicator.

With the technical solution provided by the present disclosure, the base station to be synchronized, which simultaneously monitors a plurality of neighboring base stations, can select one neighboring base station to perform time-service synchronization according to different criteria in order, such as whether CoMP is necessary, the time-service hop count, time-service delay, and the CQI level (channel quality indicator) and the like. That is, a most suitable synchronization source is determined according to a certain priority order. Such solution both applies to the phase of initial establishment of air interface self-synchronization between base stations, and the phase of periodic maintenance of synchronization. In addition, the technical effect of such solution is particularly prominent in the case of intensively arranged Small Cell.

Preferably, the step S5 further comprises:

if the number of the neighboring base stations having the maximum channel quality indicator, which is denoted as $N_3$, is greater than 1, then the base station to be synchronized randomly synchronizes with one of the $N_3$ neighboring base stations.

Preferably, the method further comprises step F after step E:

step F: the base station to be synchronized repeats steps A to E at intervals of every predetermined time span.

Wherein said predetermined time span is preferably one second.

Assuming that a base station A is the base station to be synchronized which has been initially synchronized with a neighboring base station B through air interface self-synchronization. Base station A needs to periodically search and select the most suitable synchronization source.

Prior to searching for the neighboring base stations, the base station A first determines whether the existing synchronous connection with the neighboring base station B is disconnected. If not, the base station A, under the condition of maintaining the current synchronous connection, keeps searching for other neighboring base stations that it can monitor. It is assumed that base station A can also monitor neighboring base stations C and D, then the base station A compares the synchronization signals among the neighboring base stations B, C and D. If the base station A is disconnected with the neighboring base station B, then the base station A compares the synchronization signals between the neighboring base stations C and D. If base station A still considers base station B as the most suitable synchronization source after going through all steps of A to E, then the existing synchronous connection is maintained; otherwise, time-service synchronization of base station A is switched to the neighboring base station C or base station D.

If the base station to be synchronized can monitor only one neighboring base station, then it directly synchronizes with this neighboring base station. If the base station to be synchronized can monitor a plurality of neighboring base stations simultaneously, then the base station firstly determines whether it needs to perform CoMP with a certain neighboring base station. Since CoMP requires relatively high-level of synchronization, the base station to be synchronized should preferentially synchronize with the neighboring base station with which CoMP is to be conducted. In the case that CoMP is not required, the base station to be synchronized estimates the time-service hop count of all the neighboring base stations, and synchronizes with the neighboring base station having the minimum hop count. Said time-service hop count of a neighboring base station refers to the number of hops for the base station to be synchronized to acquire the absolute-time synchronization based on this neighboring base station. If there is a plurality of neighboring base stations having the minimum hop count, the base station to be synchronized further determines the time-service delay of these neighboring base stations, and synchronizes with the neighboring base station having the minimum time-service delay. If there is a plurality of neighboring base stations having the minimum time-service delay, the base station to be synchronized further measures the channel quality of these neighboring base stations. The channel quality is mainly reflected in factors such as channel delay, signal to noise ratio (SNR), signal to interference plus noise ratio (SINR), and signal to noise distortion ratio (SNDR) and the like, and can be measured by the CQI value. Generally, a higher CQI value means a better channel quality, and vice versa. In the case that there are multiple neighboring base stations having the same maximum CQI, then the base station to be synchronized may randomly select one from the neighboring base stations for synchronization.

The above process may guarantee that the base station to be synchronized always completes the synchronous connection with the most suitable neighboring base station.

Figure 2:
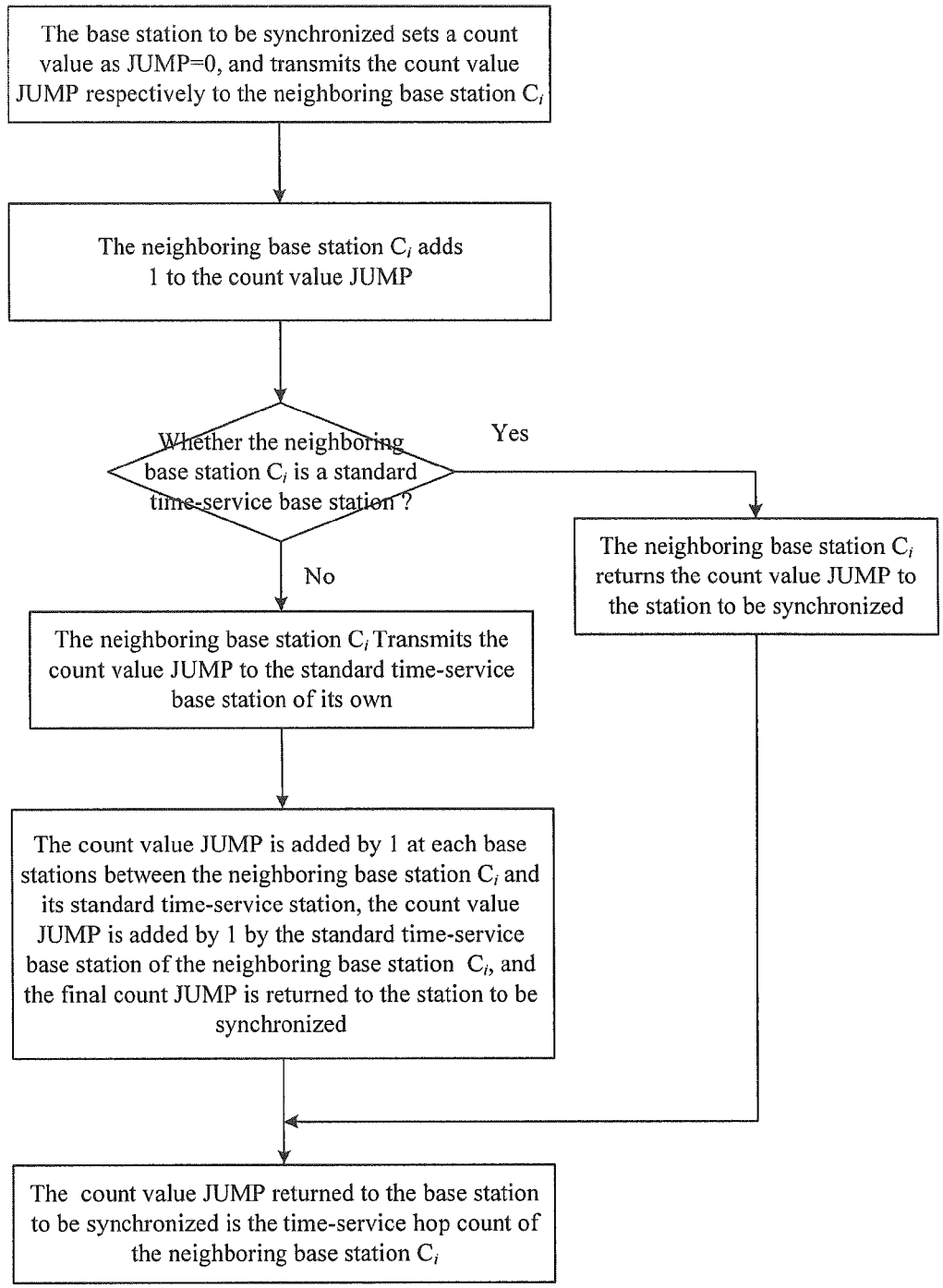
FIG. 2 a flowchart of the calculation of hop count of a synchronization signal according to an embodiment of the present disclosure.

In said step C, the process that the base station to be synchronized detecting the time-service hop count of the $N_0$ neighboring base stations is as shown in FIG. 2, comprising:

said base station to be synchronized sets a count value as JUMP=0, and the count value JUMP is transmitted, along with a hop count detection signal, respectively to each of these $N_0$ neighboring base stations $C_i$, wherein $1 \leq i \leq N_0$;

After the neighboring base station $C_i$ receives the hop count detection signal, it adds 1 to the count value JUMP, and the neighboring base station $C_i$ determines whether it is a standard time-service base station. If so, the neighboring base station $C_i$ directly returns the count JUMP to the station to be synchronized; otherwise, it transmits the count value JUMP to the standard time-service base station of its own. In the meantime, the count value JUMP is added by 1 at each base station between the neighboring base station $C_i$ and its standard time-service station. The standard time-service station of the neighboring base station $C_i$ adds 1 to the count value JUMP, and returns the final count value JUMP to the station to be synchronized.

The station to be synchronized denotes the returned count value JUMP received as the time-service hop count of the neighboring base station $C_i$.

Application of such method in the case of Small Cells (small cell base stations) will be described in details through the following examples.

Example 1

Figure 3:
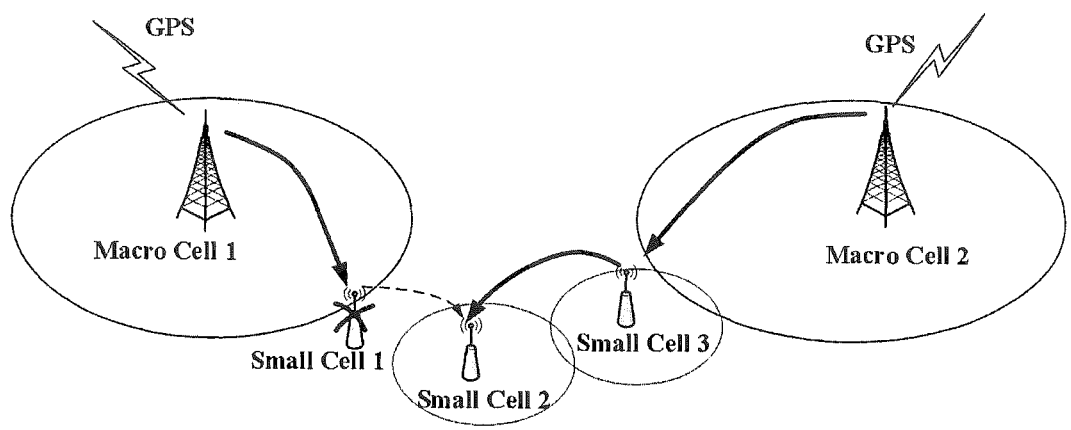
FIG. 3 schematically shows a system according to Example 1 of the present disclosure.

As shown in FIG. 3, there are two macro cell base stations, namely Macro Cell 1 and Macro Cell 2, and three small cell base stations, namely Small Cell 1, Small Cell 2, and Small Cell 3. The macro cell base stations are standard time-service base stations, which have synchronized with the absolute time by means of GPS, while the small cell base stations realize synchronization by means of air interface self-synchronization. Small Cell 2 is configured as the base station to be synchronized which can search synchronization signals from the neighboring base stations Small Cell 1 and Small Cell 3 simultaneously.

1. At an initial state, Small Cell 2 synchronizes with Macro Cell 1 through multi-hop of Small Cell 1.

2. As shown in FIG. 3, at some point, Small Cell 1 is switched off, and Small Cell 2 loses the synchronization source after the periodical search, and begins to search for a new synchronization source.

3. Since Small Cell 1 can only search synchronization signal from Small Cell 3, it synchronizes with Small Cell 3.

Example 2

Figure 4:
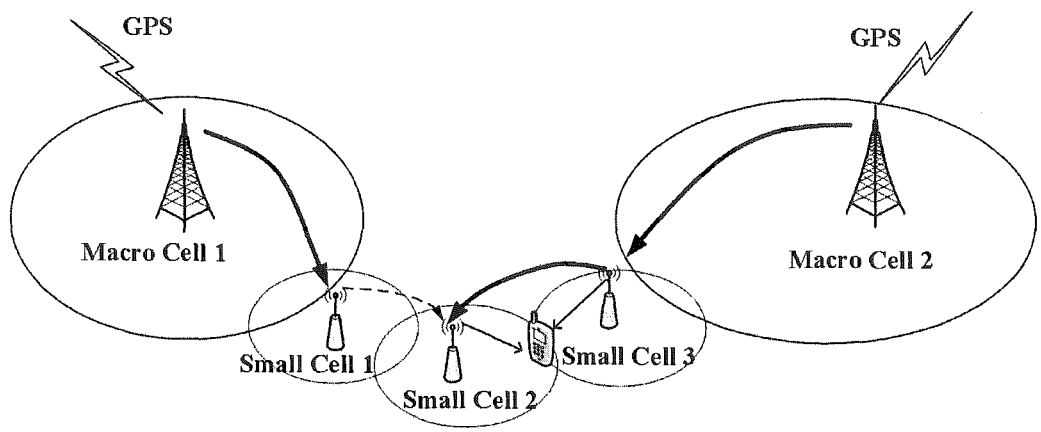
FIG. 4 schematically shows a system according to Example 2 of the present disclosure.

As shown in FIG. 4, there are two macro cell base stations, namely Macro Cell 1 and Macro Cell 2, and three small cell base stations, namely Small Cell 1, Small Cell 2 and Small Cell 3. The macro cell base stations are standard time-service base stations, which have synchronized with the absolute time by means of GPS, while the small cell base station realize synchronization by means of air interface self-synchronization. Small Cell 2 is configured as the base station to be synchronized which can search synchronization signals from the neighboring base stations Small Cell 1 and Small Cell 3 simultaneously.

1. At an initial state, Small Cell 2 synchronizes with Macro Cell 1 through multi-hop of Small Cell 1. Small Cell 2 can receive the synchronization signals of Small Cell 1 and Small Cell 3 simultaneously 2. As shown in FIG. 4, at some point, UE appears between Small Cell 2 and Small Cell 3, sending out a CoMP request.

3. Small Cell 2 switches to synchronize with Small Cell 3, and cuts off the synchronous connection with Small Cell 1.

Example 3

Figure 5:
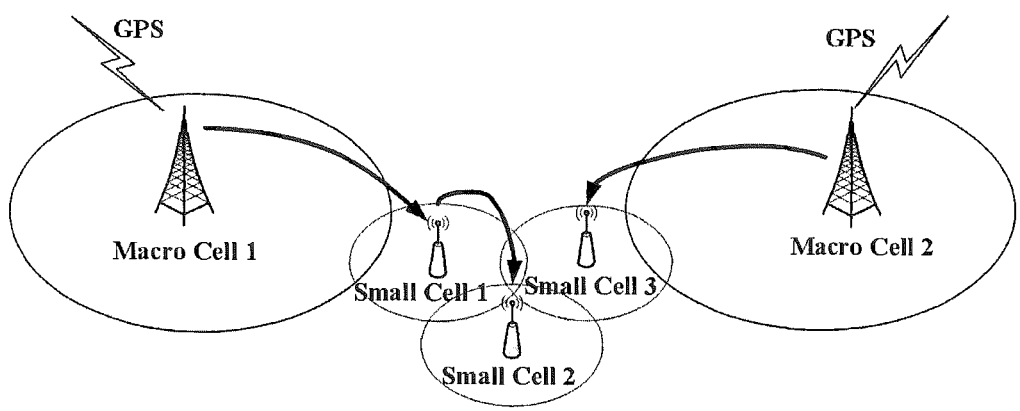
FIG. 5 schematically shows an initial system according to Example 3 of the present disclosure.

As shown in FIG. 5, there are two macro cell base stations, namely Macro Cell 1 and Macro Cell 2, and three small cell base stations, namely Small Cell 1, Small Cell 2 and Small Cell 3. The macro cell base stations are standard time-service base stations, which have synchronized with the absolute time by means of GPS, while the small cell base stations realize synchronization by means of air interface self-synchronization. Small Cell 2 is configured as the base station to be synchronized, which can search synchronization signals from the neighboring base stations Small Cell 1 and Small Cell 3 simultaneously.

1. As shown in FIG. 5, at an initial state, Small Cell 1 obtains synchronization with Macro Cell 1, and Small Cell 3 acquires synchronization with Macro Cell 2, and Small Cell 2 is synchronized through Small Cell 1.

Figure 6:
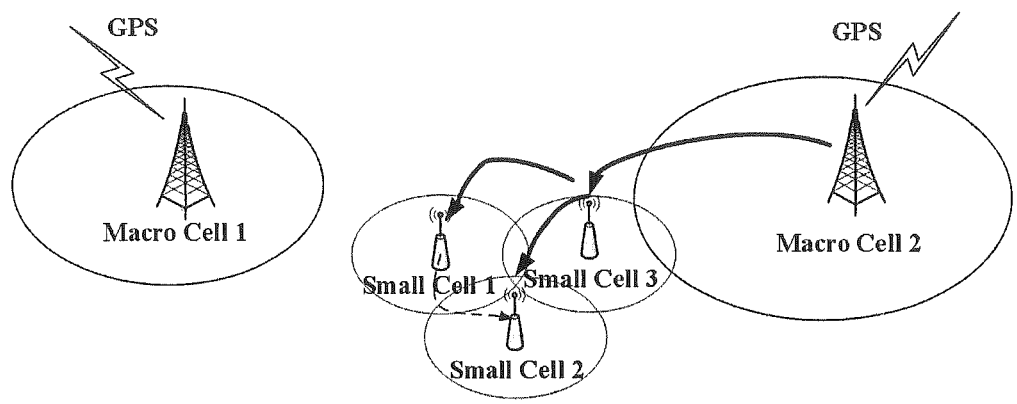
FIG. 6 schematically shows a final system according to Example 3 of the present disclosure.

2. As shown in FIG. 6, at some point, Macro Cell 1 disconnects the synchronization signal to Small Cell 1, and then Small Cell 1 performs synchronization with Small Cell 3.

3. Small Cell 2 can still search out the synchronization signals of Small Cell 1 and Small Cell 3, and there is no UE to send a CoMP request.

4. Small Cell 2 determines the time-service hop count of Small Cell 1 and that of Small Cell 3, and it finds out that the sync hop count to Small Cell 1 is 3, and the sync hop count to Small Cell 3 is 2.

5. As shown in FIG. 6, Small Cell 2 switches to synchronize with Small Cell 3.

Example 4

Figure 7:
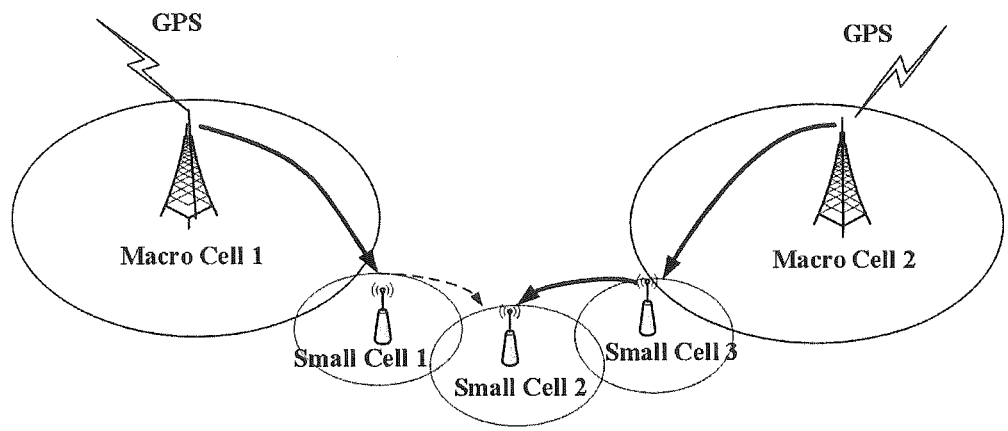
FIG. 7 schematically shows a system according to Example 4 of the present disclosure.

As shown in FIG. 7, there are two macro cell base stations, namely Macro Cell 1 and Macro Cell 2, and three small cell base stations, namely Small Cell 1, Small Cell 2 and Small Cell 3. The macro cell base stations are standard time-service stations, which have synchronized with the absolute time by means of GPS, while the small cell base stations realize synchronization by means of air interface self-synchronization. Small Cell 2 is configured as the base station to be synchronized, which can search synchronization signals from the neighboring base stations Small Cell 1 and Small Cell 3 simultaneously.

1. At an initial state, Small Cell 1 performs synchronization with Macro Cell 1, Small Cell 3 performs synchronization with Macro Cell 2, and Small Cell 2 acquires synchronization through Small Cell 1.

2. Within a periodical tracking phase, Small Cell 2 can still search out synchronization signals of Small Cell 1 and Small Cell 3, and there is no UE to send a CoMP request, wherein time-service hops and time service delay of Small Cell 1 is equal to those of Small Cell 3.

3. Small Cell 2 estimates and compares the synchronization signals of Small Cell 1 and Small Cell 3 within a synchronization cycle. The channel quality of Small Cell 1 is kept lower than that of Small Cell 3 in multiple consecutive cycles, wherein CQI of Small Cell 1 is between 5 and 8, while CQI of Small Cell 3 is between 10 and 12.

4. As shown in FIG. 7, Small Cell 2 switches to synchronize with Small Cell 3.

Using the technical solution of the present disclosure, the base station to be synchronized, which simultaneously monitors a plurality of neighboring base stations, can select one neighboring base station to perform time-service synchronization according to different criteria in order, such as whether CoMP is necessary, the time-service hop count, time-service delay, and the CQI level (channel quality indicator) and the like. That is, a most suitable synchronization source is determined according to a certain priority order. Such solution both applies to a phase of initial establishment of air interface self-synchronization between base stations, and to a phase of periodic maintenance of synchronization. In addition, the technical effect of such solution is more prominent in the case of intensively arranged Small Cells.

The above mentioned are only preferred embodiments of the present disclosure. It should be noted that for ordinary person skilled in the art, further modifications and substitutions, which should be deemed as falling into the scope of the present disclosure, can be made without departing from the technical principle of the disclosure.

The invention claimed is:

1. A method for air interface synchronization, comprising the steps of:
    step A: searching, through a base station to be synchronized, for all neighboring base stations that can be monitored by the base station to be synchronized, and denoting the number of all neighboring base stations as $N_0$, wherein if $N_0$ is 1, the base station to be synchronized performs synchronization with this neighboring base station, and if $N_0$ is greater than 1, proceeding to step B,
    step B: determining, through the base station to be synchronized, whether said base station to be synchronized needs to perform coordinated multipoint transmission with one of the $N_0$ neighboring base stations, wherein if so, the base station to be synchronized performs synchronization with the neighboring base station with which the base station needs to perform coordinated multipoint transmission, otherwise, proceeding to step C,
    step C: detecting, through the base station to be synchronized, the respective numbers of time-service hop count of the $N_0$ neighboring base stations, and denoting the number of the neighboring base stations having the minimum time-service hop count as $N_1$, wherein if $N_1$ is 1, the base station to be synchronized performs synchronization with this neighboring base station having the minimum hop count, otherwise, proceeding to step D,
    step D: detecting, through the base station to be synchronized, the time-service delay of the $N_1$ neighboring base stations, and denoting the number of neighboring base stations having the minimum time-service delay as $N_2$, wherein if $N_2$ is 1, the base station to be synchronized performs synchronization with the neighboring base station having the minimum time-service delay, otherwise, proceeding to step E, and
    step E: detecting, through the base station to be synchronized, the channel quality indicators of the $N_2$ neighboring base stations, and performing synchronization with the neighboring base station having the maximum channel quality indicator.

2. The method according to claim 1, wherein step E further comprises:
    if the number of neighboring base stations have the maximum channel quality indicator, which is denoted as $N_3$, is greater than 1, the base station to be synchronized randomly performs synchronization with one of the $N_3$ neighboring base stations.

3. The method according to claim 1 or claim 2, wherein the channel quality indicator is obtained based on the channel delay, signal to noise ratio, signal to interference plus noise ratio, and the signal to noise distortion ratio.

4. The method according to claim 1, further comprising a step F after step E:
    step F: repeating the steps A to E, through the base station to be synchronized, at intervals of each predetermined time span.

5. The method according to claim 4, wherein the predetermined time span is one second.

6. The method according to claim 1, wherein in step C, detecting through the base station to be synchronized the time-service hop count of the $N_0$ neighboring base stations specifically comprises:
    setting, through the base station to be synchronized, a count value JUMP=0, and transmitting the count value JUMP respectively to each of these $N_0$ neighboring base stations $C_i$, wherein $1 \le i \le N_0$;
    adding, through the neighboring base station $C_i$, 1 to the count value JUMP, and determining whether the neighboring base station $C_i$ is the standard time-service base station, wherein if so, the neighboring base station $C_i$ directly returns the count value JUMP to the station to be synchronized, otherwise it transmits the count value JUMP to the standard time-service base station of its own,
    adding 1 to the count value JUMP at each base station between the neighboring base station $C_i$ and the standard time-service station, and returning the final count value JUMP to the station to be synchronized, and
    denoting the count value JUMP returned to the base station to be synchronized as the time-service hop count of the neighboring base station $C_i$.

7. The method according to claim 1, wherein the base station to be synchronized is a small cell base station.

* * * * *